United States Patent [19]

Schacht

[11] Patent Number: 5,109,898

[45] Date of Patent: May 5, 1992

[54] PROCESS FOR THE MANUFACTURE OF MULTI-PLY PANEL BOARDS PREFERABLY FOR FLOORS

[76] Inventor: Peter Schacht, Miesenbacher Str. 69, 8222 Ruhpolding, Fed. Rep. of Germany

[21] Appl. No.: 493,258

[22] Filed: Mar. 14, 1990

[30] Foreign Application Priority Data

Mar. 17, 1989 [DE] Fed. Rep. of Germany ....... 3908851

[51] Int. Cl.⁵ .............................................. B27G 11/00
[52] U.S. Cl. .................................... 144/350; 52/586; 156/254; 156/265; 156/300; 144/346
[58] Field of Search .............. 156/182, 254, 265, 300; 144/346, 347, 348, 350, 351; 52/586

[56] References Cited

U.S. PATENT DOCUMENTS

| | | | |
|---|---|---|---|
| 1,102,036 | 6/1914 | Ganter | 144/347 |
| 1,594,889 | 8/1926 | Loetschere | 144/351 |
| 1,840,974 | 1/1932 | Rockwell | 144/350 |
| 3,878,017 | 4/1975 | Etzold | 144/348 |

Primary Examiner—W. Donald Bray
Attorney, Agent, or Firm—Armstrong, Nikaido, Marmelstein, Kubovcik & Murray

[57] ABSTRACT

Multi-ply floor panel boards are cut from a sheet composed of individual, glued plies. The plies of two such sheets are now placed together underside to underside and glued together. Then double board blanks in the size of the panel boards to be manufactured are cut from the composite sheet formed in this way. After hardening of the glue, these double board blanks are halved along their middle plane, so that two panel boards completely free of warping are formed. The plies adjoining the middle plane of the composite sheet preferably form a continuous middle ply. This can be provided on both sides with incisions reaching to the middle plane, so that, after halving of the double board blanks, each panel board has a bottom ply with continuous parting cuts. The grooves and tongues that are sometimes necessary along the edges of the panel boards are already made in the edges of the double board blanks in one working cycle for each two panel boards.

12 Claims, 3 Drawing Sheets

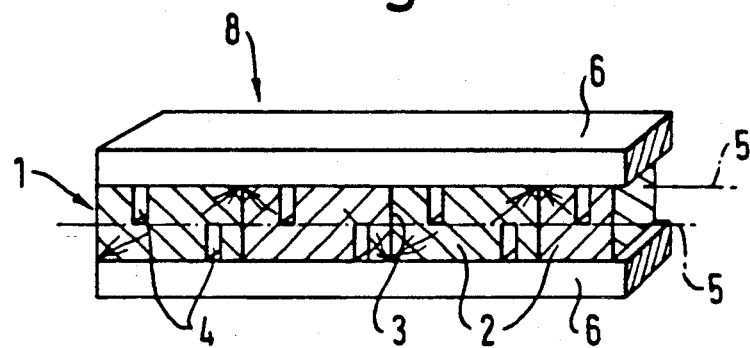
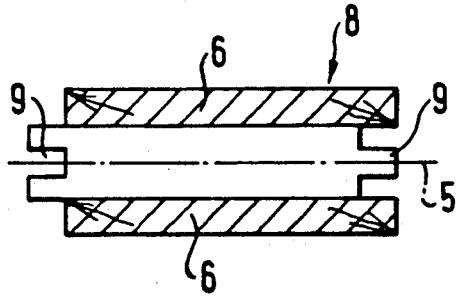
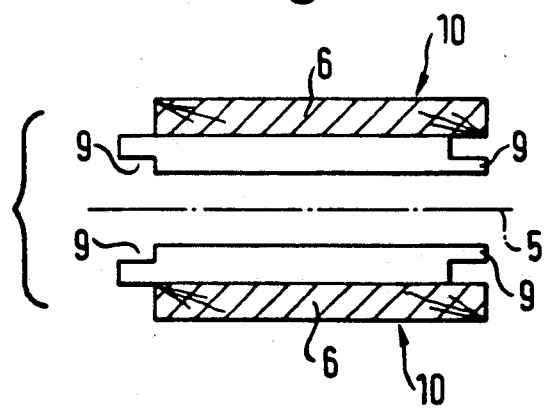

PROCESS FOR THE MANUFACTURE OF MULTI-PLY PANEL BOARDS PREFERABLY FOR FLOORS

FIELD OF THE INVENTION

The invention relates to a process for manufacture of plywood panel boards preferably for floors.

BACKGROUND OF THE INVENTION

Panel boards for floors are made as cross-veneered boards in order to prevent excessive distortions due to moisture and heat influences after being laid.

In this connection the known panel boards have, besides the tread ply that forms the actual tread surface, a crossband ply glued therewith, which is formed from wooden boards or slats and the fiber grain of which extends in each case at right angles to that of the tread ply.

In order to prevent the so-called "dishing" of such panel boards, the crossband ply is cut through in the longitudinal direction of its fiber grain by incisions running at right angles to the tread surface and intended to prevent the situation that working of the crossband ply at right angles to its fiber direction leads to arching of the panel board.

In the manufacture of such panel boards, a sheet is first manufactured, for example by means of a heatable press, from tread and crossband ply, into which sheet mutually parallel slots are sawed from the surface facing away from the tread ply, which slots must on the one hand completely pass through the crossband ply but on the other hand are not to penetrate into the tread ply if at all possible.

This machining requires a high degree of accuracy and is therefore expensive.

This machining is effected by a multi-blade circular saw, in which a plurality of circular saw blades are mounted side-by-side on a rotating machine shaft.

Since the working width of such a multi-blade circular saw is limited, the sheet machined herewith also can have only this limited width.

The sheet machined in this way is then sawed into individual panel boards, which if necessary are additionally subjected to finish-machining, for example surface grinding of the tread surface, milling of grooves and tongues into the side edges and the like.

The saw cuts are made in the fiber direction of the tread ply, i.e., at right angles to the incisions, so that the length of the panel boards manufactured in this way most agrees with the working width of the multi-blade circular saw.

However, there is also another reason why the manufacture of longer panel boards is not possible:

During gluing, the individual wood constituents are exposed to the moisture of the glue and possibly also to heat, so that the sheet manufactured by gluing can warp before the glue has fully hardened. As a result of the moisture of the glue, subsequent warping usually occurs even after hardening of the glue.

In practice, the warping can still be evened out only by finish-machining by a material-removing process; thus, since the extent of warping increases with the dimension of the panel board, while only a thin layer of the tread surface may be removed by finish-machining, the length of the panel board is very limited for this reason.

Furthermore, it is obvious that the warping which occurs interferes with precise milling of the slots in the crossband ply.

The panel board manufactured by this known process has the advantage of being relatively thin, so that when it is laid on a cast plaster floor it conforms to any minor unevennesses that may be present and does not, as in the case of a thicker panel board, span over these in unsupported manner, so that the known panel board does not flex during local load.

In order to simplify the expensive manufacture of multi-ply panel boards, a process is also known in which, as in the aforesaid, known process, the tread ply is glued with a crossband ply of wooden boards or slats, the fiber grain of which extends at right angles to that of the tread ply.

On the surface of the crossband ply facing away from the tread ply, there is now glued a further ply, the fiber grain of which matches that of the tread ply and which is intended to absorb tensile stresses, whereby the above-described "dishing" as well as the above-described warping that occurs during gluing is intended to be counteracted.

However, in order to prevent the situation, for the aforesaid reasons, that the panel board becomes too thick, there is used in practice, as the further ply, a rotary-cut veneer, the cross section of which is much too small in order actually to absorb such large forces as are necessary to counteract warping effectively.

Thus expensive finish-machining by material-removing processes is also necessary for this known panel board, if warping has occurred during gluing.

SUMMARY OF THE INVENTION

Starting from this prior art, the object of the invention is to further develop the two known processes for the manufacture of panel boards by providing that the respective manufacturing process for panel boards of the described type is simplified, so that panel boards free of warping and possibly finish-machined can be manufactured with smaller expense than was necessary heretofore.

Furthermore, the former process is to be further developed such that panel boards of up to a few meters length can be manufactured.

This object is achieved based on the following common solution concepts:

In the known processes, a sheet is formed from the boards or slats of the tread ply, the crossband ply and possibly the further ply by gluing. According to the invention, now not a single sheet but a double arrangement of the individual plies is glued, in which process there is placed, on the surface facing away from the tread surface in one sheet, the surface facing away from the tread face in a second sheet that is identical in material, size and fiber grain, whereby a composite sheet is formed that on each of its two surfaces has a tread surface, parallel to which and centrally there runs a plane of symmetry.

The two plies adjoining the plane of symmetry are identical in fiber direction and material, and therefore can also be formed by a single ply, the thickness of which corresponds to that of the two plies.

This composite sheet is sawed after gluing into double board blanks, the surface of which corresponds respectively to approximately that of the panel boards to be manufactured, possibly plus a machining allowance.

Since the arrangement is constructed completely symmetrically in cross section, warping which is identical in direction and magnitude occurs on both sides of the plane of symmetry, so that the warping of the two halves of this composite sheet is fully compensated. The resulting composite sheet as well as the double board blanks cut therefrom is completely free of warping.

After cooling of the composite, hardening of the glue and extensive drying of the wood parts moistened by the glue, the double board blanks are now halved along the above-described plane of symmetry, in which process the width of cut of the halving cut must be taken into consideration for the dimensioning respectively of that ply which lies in the plane of symmetry or those plies which adjoin the plane of symmetry.

Since the panel boards obtained in this way ar free of warping they need no finish-machining to even out the warping.

It is basically possible, for example by using a hot-melt adhesive for manufacture of the composite sheet, to halve the double board blanks immediately after production thereof, since at that time the hot-melt adhesive has already cooled sufficiently and hardened herewith.

In contrast, in the use of a glue that moistens the wood parts contacted by it, warping of the finished panel boards is to be expected if halving is already performed before the double board blanks are dry.

According to a preferred embodiment of the invention, it is even advantageous to store the double board blanks for complete drying for a few days, preferably in a drying chamber, and in fact preferably for about two days, in order to be completely certain that warping, albeit only slight, does not still occur after halving of the double board blank.

The panel boards obtained by the process according to the invention can then be machined along their long edges and provided with a groove and tongue arrangement.

According to a preferred embodiment of the invention, however, this machining is performed already on the double board blanks which have not yet been halved, since therein the two panel boards which are still bonded together at the plane of symmetry can be provided in a single working cycle with their necessary grooves and tongues, whereby yet another simplification of the manufacturing process is achieved.

According to the first embodiment, for the manufacture of panel boards the crossband ply of which is cut through by slots, the abovedescribed basic process according to the invention is modified in the following manner:

First a sandwich ply is created by gluing boards or slats of wood to each other along their long edges. The thickness of this sandwich ply is twice that of the crossband ply provided on the panel board plus the width of that halving cut which is necessary for halving the double board blanks.

In the sandwich ply obtained and dimensioned in this way, incisions from both sides are now made which correspond in direction and spacing to the slots in the underside of the crossband ply of the panel board to be manufactured but which reach only to about the center of the thickness of the sandwich sheet.

Onto each side of this premilled sandwich sheet there is now glued a tread ply, the fiber grain, material and dimensioning of the two tread plies being identical.

After gluing, hardening of the glue, drying of the composite sheet obtained in this way and cutting into double board blanks, each double board blank is now halved in the above-described way, the depth of the incisions into the sandwich sheet being dimensioned such that the incisions reach at least to the halving cut but do not extend beyond or far beyond this.

Whereas in the known process the greatest accuracy was indicated for introducing the incisions in order to ensure on the one hand that the crossband ply is completely cut through but on the other hand to prevent the situation that the tread ply is cut into, in the process according to the invention the exact depth of the incisions is unimportant provided that the incisions each reach to the halving cut.

It is basically possible and, for achieving a particularly symmetrically formed sheet also advantageous, for the incisions to be made exactly opposite each other in the two surfaces of the sandwich sheet. In this case, however, the depth of the incisions must again be made with relatively high accuracy, in order to ensure that the sandwich sheet is not accidentally completely cut through or breaks apart during placement in the glue press.

It is therefore advantageous according to a preferred embodiment of the invention for the incisions to be offset relative to each other in the two surfaces of the sandwich sheet, the incision in the one surface preferably being disposed midway between two incisions of the opposite surface, in order to achieve the most uniform possible stress distribution in the composite sheet to be manufactured.

The incisions are preferably made with a multi-blade circular saw, the working width of which is limited as already mentioned in the introduction. According to the invention, the width of the sandwich ply is now dimensioned such that it does not exceed the working width. However after the incisions have been made, a plurality of these sandwich plies are glued flush with each other along their long edges, so that after gluing of the two tread plies on the surfaces of the arrangement obtained in this way a composite sheet is formed, the length of which in the direction of the fiber grain of the tread plies is 3.5 m to 6 m, preferably 4 m to 5 m, so that it is possible by the process according to the invention to manufacture panel boards of corresponding length.

In making the incisions in the sandwich ply, further milling operations can also be performed preferably in the same working cycle, provided this is necessary.

For further development of the two processes cited in the introduction for the manufacture of three-ply panel boards, according to the second embodiment the elements of the one tread ply are glued first, then those of the associated crossband ply, then those of a sandwich ply, in turn those of the second crossband ply, and thereupon those of the second tread ply are placed and glued together. In this case the directions of the fiber grain in respectively adjacent plies are at right angles to each other, except for that case in which the sandwich ply is formed from two individual plies each adjoining the plane of symmetry; their fiber grain is the same.

The middle ply lying between the two crossband plies has a thickness that corresponds to twice that of the lower ply of the panel board to be manufactured as well as to the width of the halving cut.

However, as described above, the middle ply can also consist of two individual plies glued together.

Whereas in the panel board manufactured by the known process the very bottom ply is usually formed by a rotary-cut veneer, in the panel board manufactured by the process according to the invention the lower ply is a little thicker and also is additionally strengthened by the glue that has penetrated thereinto and hardened in unwarped condition. Thus a panel board is formed which is still quite thin but free of warping, and in which the lower ply is later capable in use of effectively counteracting warping.

Where thickness of the panel board is not a consideration, it is also possible to replace the middle ply by a number of several plies; in this case it is essential to have a symmetric arrangement of fiber grain, material and dimensioning relative to the aforesaid plane of symmetry. Thicker panel boards, which do not sag under normal load, are preferably laid on flooring joists.

In total, the invention therefore permits the manufacture of warping-free and relatively thin plywood panel boards, as can be used preferably as floor covering.

Such floor panel boards are applicable not only for new buildings but quite especially for rehabilitation of old buildings, since there the panels must be as thin as possible because of the already predetermined floor heights; moreover, moisture influences are often to be expected in the rehabilitation of old buildings, where warping-free panel boards are particularly appropriate.

A further preferred area of application for the panel boards manufactured by the process according to the invention is the covering of floor heating systems: because of the headroom required by such a heating system, a thin panel is particularly appropriate; furthermore, this thin panel has a relatively small thermal insulation effect, so that the response characteristic of the floor heating system is not substantially impaired and in particular heat build-up is prevented.

The panels manufactured by the process according to the invention can be used not only as floor panels but also as wall and ceiling panels and furthermore as panels for lining water and land craft, especially where they are exposed to varying temperatures and to humidity.

The process according to the invention permits the employment and the full utilization of the largest glue presses, and so the manufactured composite sheets can have a length and width of several meters.

BRIEF DESCRIPTION OF THE DRAWINGS

The subject matter of the invention is explained in more detail on the basis of the examples of the attached schematic drawing, wherein:

FIGS. 1a to 1e show the individual process steps of a process according to a first embodiment of the invention.

DESCRIPTION OF THE PREFERRED EMBODIMENTS

Figure 1A:
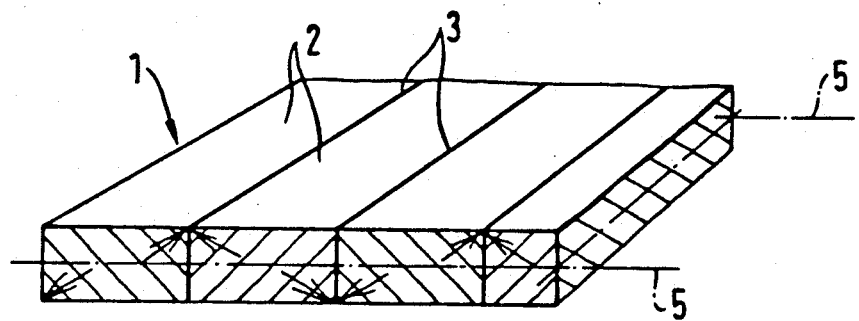
Figure 1B:
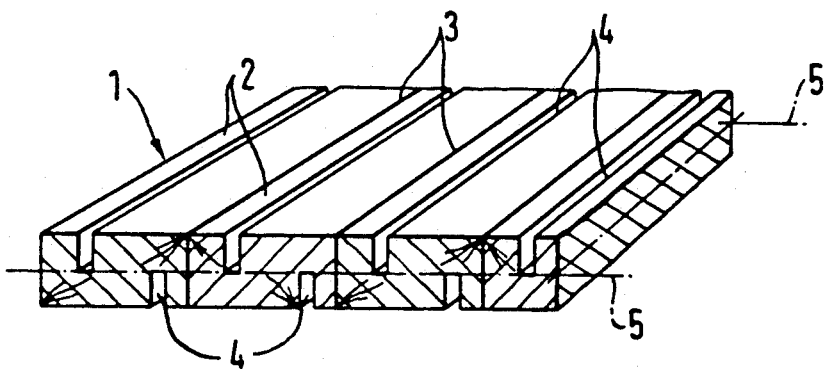
Figure 1C:
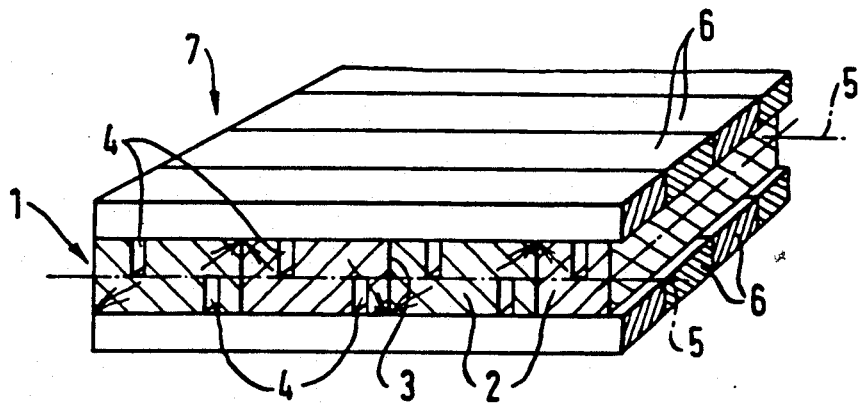
Figure 2A:
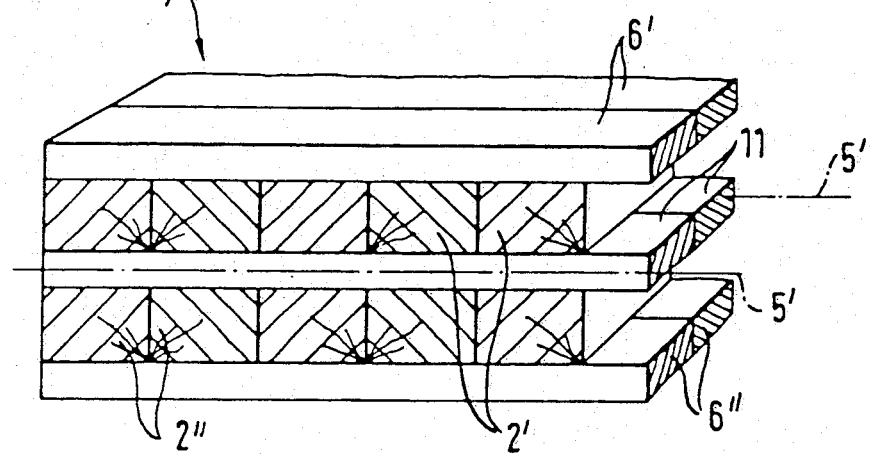
FIGS. 2a to 2d show the process steps of a further embodiment of the process according to the invention.
Figure 2B:
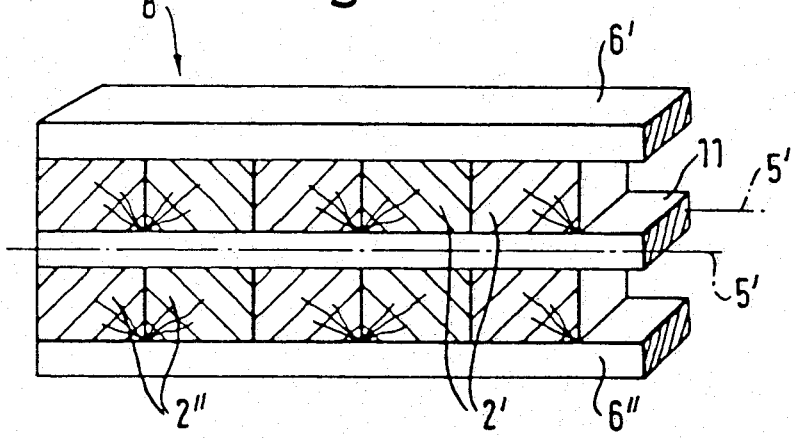
Figure 2C:
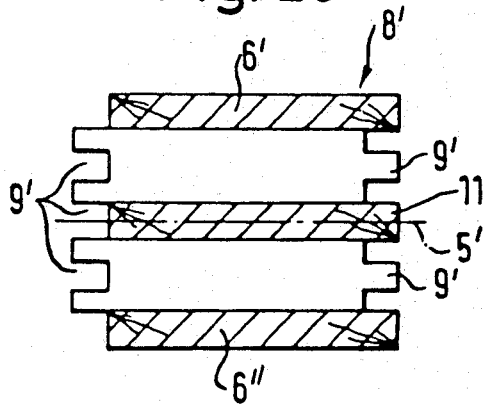
Figure 2D:
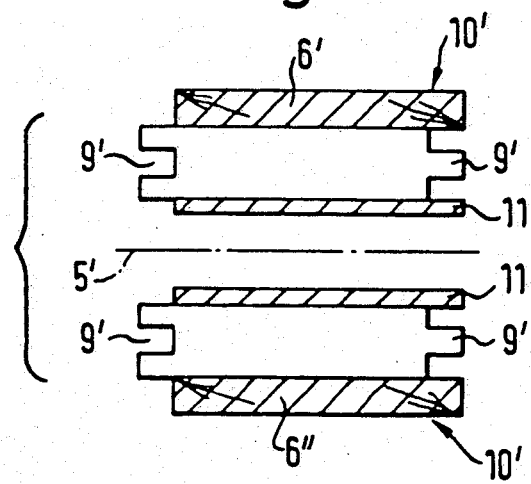

FIGS. 1a to 1d as well as 2a and 2b are respectively diagrams of a sandwich sheet (FIGS. 1a and 1b), a composite sheet (FIGS. 1c and 2a) and a double board blank (FIGS. 1d and 2b) in oblique view and broken away, while the other figures are end views of a double board blank (FIGS. 1e and 2c) and of a panel board (FIGS. 1f and 2d).

In FIG. 1a there is shown a sandwich sheet 1 which is formed by mutual gluing together of wooden boards or slats 2 along their long edges; the glued locations are denoted by 3.

The middle plane of the sandwich sheet formed in this way is represented by 5.

As shown in FIG. 1b, incisions 4 starting from both surfaces are milled into the sandwich sheet, which incisions extend parallel to the long grain of the wooden boards or slats 2 as well as perpendicular to the surfaces.

As is clear from the drawing, the incisions 4, starting from the respective surface of the sandwich sheet 1, extend to the middle plane 5 and a little beyond it.

It is also clear from the drawing that the slots 4 of the top and bottom side of the sandwich sheet are offset relative to each other by half of one spacing (distance between adjacent slots of one surface).

The incisions 4 are introduced by means of a multi-blade circular saw into the sandwich sheet, which is allowed to pass under this saw one time for each side.

Such a sandwich sheet has only a limited width; if necessary, several such sandwich sheets are therefore glued together with their long edges, in order in this way to create the sandwich ply of a composite sheet, which has at least the length of the panel boards to be manufactured in the direction at right angles to the incisions 4.

Thereafter, as is clear from FIG. 1c, boards 6 respectively adjoining each other are glued with the top and bottom side of the sandwich sheet 1 or the sandwich ply formed from a plurality of sandwich sheets, which boards 6 respectively form a top and a bottom tread ply and the fibers of which extend at right angles to those of the sandwich sheet o sheets 1.

After gluing, therefore, a three-ply composite sheet 7 is obtained which has a tread ply 6 on its top and bottom side.

This composite sheet is then cut into double board blanks, each line of cut extending perpendicular to the surfaces and parallel to the fiber grain in the tread plies 6 (FIG. 1d).

The double board blanks 8 obtained in this way are, as shown in FIG. 1e, provided along the longitudinal edges with a groove-and-tongue arrangement 9; in addition, the respective free surface of the tread plies 6 (tread surface) can be ground. In some cases it is also advantageous to glaze, to impregnate and/or to mortise the two tread surfaces of the double board blank, the moisture penetration into the wood as a result of this treatment occurring symmetrically and thus leading to no kind of warping.

Thereafter, as shown in FIG. 1f, the finally trimmed, hardened and dried double board blanks are halved along the middle plane 5 by one cut, whereby two multi-ply panel boards 10 are formed.

The sandwich ply 1 shown in FIG. 1a preferably has a thickness of 20 mm, a length of 5 m and a width of 1.5 m. The thickness of the tread ply 6 (FIG. 1c) is 7.8 mm. The width of the halving cut is about 3.5 to 4 mm. A panel board of this type is especially suitable for laying on a plaster floor that is not completely even and over floor heating systems.

In FIG. 2a there is shown a composite sheet 7', which is formed from five superposed plies, specifically a tread ply 6" at the bottom in the diagram, a crossband ply 2" lying thereupon, a middle ply 11' lying thereupon, a crossband ply 2' in turn lying thereupon and a tread ply 6' on top.

The dimensions, the material and the fiber grain in the bottom and top tread ply 6 are respectively equal; the same is true for the two crossband plies 2', 2".

Moreover, the fiber grain of each two adjacent plies is respectively at right angles to each other.

The composite sheet formed from individual wooden boards or slats 2', 2", 6', 6" and 11 is glued in the form shown in FIG. 2a and then cut into double board blanks 8'; one of these double board blanks 8' is shown in FIG. 2b.

The cut in this case is made respectively perpendicular to the surfaces and parallel to the fiber grain of the two tread surfaces 6' and 6".

Thereafter groove and tongue arrangements 9 are milled into the two longitudinal edges of the section 8' (FIG. 2c); subsequently, after hardening of the glue as well as cooling and drying of the composite sheet, the double board blank 8' is divided along its middle plane 5', as shown in FIG. 2d, into two panel boards 10' by a halving cut.

The composite sheet shown in FIG. 2a has five plies each with a thickness of 7.8 mm; the width of the halving cut is 2.8 mm, so that the lower ply shown in FIG. 2d has a thickness of 2.5 mm. A panel board of the type shown in FIG. 2d is especially suitable for laying on flooring joists.

The plies corresponding to each other and lying opposite each other relative to the plane of symmetry of the respective composite sheet or of the respective double board blank each have the same fiber direction as well as such a thickness and such a material that the warping caused by each of these two plies is exactly equal and thus is compensated by that of the other sheet; although not necessary in every case, the plies corresponding symmetrically to each other are preferably each formed from the same material and each have the same dimensions and the same structure.

Besides the process, the invention also relates expressly to composite sheets, double board blanks and panel boards manufactured by the process according to the invention.

I claim:

1. A process for the manufacture of multi-ply panel boards comprising the steps of:
   forming a sandwich sheet by gluing of wooden boards or slats to one another along long edges thereof;
   making a plurality of incisions, which reach at least up to just before a middle plane of the sandwich sheet, said incisions being perpendicular to surfaces thereof and parallel to fiber grain in each of upper and lower surfaces of the sandwich sheet;
   gluing a tread ply onto each of the upper and lower surfaces of the sandwich sheet forming a composite sheet;
   sawing the composite sheet into double board blanks, a size of which in a respective tread surface corresponds approximately to that of the panel boards to be manufactured; and
   halving the double board blanks along the middle plane between the two tread surfaces, by a parting cut that intersects to the incisions.

2. A process according to claim 1, further comprising the step of making the incisions lie opposite each other on the two surfaces of the sandwich sheet or are offset relative to each other.

3. A process according to one of claims 1 or 2, further comprising the step of simultaneously making a plurality of incisions by means of a multi-blade circular saw, into the sandwich sheet, which in width does not exceed a working width.

4. A process according to claim 3, further comprising the step of gluing together a plurality of sandwich sheets provided with incisions with each other along long edges before gluing of the tread plies.

5. A process according to claim 4, further comprising the step of gluing together so many sandwich sheets provided with incisions with each other that the composite sheet reaches a length of 3.5 m to 6 m, preferably 4 m to 5 m, in the fiber direction of the tread plies.

6. A process for the manufacture of multi-ply panel boards comprising the steps of:
   gluing a first tread ply with a first crossband ply, said first tread ply consists of a plurality of adjacently lying wooden boards with respectively longitudinally running fibers, said first tread ply forms a visible or tread surface, said first cross band ply consists of adjacently lying wooden boards or slats, fibers of said first crossband ply are disposed parallel to the first tread surface and perpendicular to fibers in the first tread ply;
   gluing a middle ply, matching the first tread ply in material and fiber grain onto the first crossband ply;
   forming a second crossband ply by matching the first crossband ply in material and fiber grain;
   gluing the second crossband ply onto a free surface of the middle ply;
   gluing a second tread ply matching the first tread ply in material and fiber grain onto a free surface of said second crossband ply to form a composite sheet;
   sawing the composite sheet into double board blanks, a size of which in respective tread surface corresponds approximately to that of panel boards; and
   halving the double board blanks to form the panel boards, by a parting cut guided in a middle plane between the two tread surfaces.

7. A process according to one of claims 1 to 6, further comprising the step of performing finish machining on a respective section before halving the section.

8. A process according to one of claims 1 to 7, further comprising the step of storing the sections, after cooling and after hardening of the glue, until the sections are at least approximately completely dried before halving the sections.

9. A process according to claim 8, wherein the storage time is a few days, preferably two days, and more preferably occurs in an air-conditioned drying chamber.

10. A wooden composite sheet for manufacture of panel boards comprising:
    a first tread ply consisting of a plurality of adjacently lying wooden boards, fibers of said first tread ply respectively run longitudinally;
    at least one crossband ply of adjacently lying wooden boards or slats, said first tread ply and at least one crossband ply joined together; and
    a second tread ply which is provided on a side of the joined first tread ply and the at least one crossband ply, said second tread ply facing away from the first tread ply, said first and second tread ply and said at least one crossband ply forming a composite sheet, wherein the first and second tread plies and the at least one crossband ply, in terms of fiber grain, dimensions and condition, are symmetrically disposed relative to a middle plane of the composite sheet.

11. A wooden composite sheet according to claim 10, wherein a single crossband ply is provided, and incisions are provided in two surfaces thereof, running in parallel to the fiber grain, said incisions extend to approximately the middle plane of the composite sheet.

12. A wooden composite sheet according to one of claims 10 or 11, wherein at least one groove or tongue is provided along side edges on both sides of the middle plane.

* * * * *